United States Patent [19]

Murphy

[11] Patent Number: 5,316,671
[45] Date of Patent: May 31, 1994

[54] SUBMERSIBLE AERATION TRAIN AND AERATION APPARATUS FOR BIOLOGICAL PURIFICATION OF SEWAGE

[76] Inventor: D. Thomas Murphy, 584 Mililani Dr., Kihei, Hi. 96753

[21] Appl. No.: 6,967

[22] Filed: Jan. 21, 1993

[51] Int. Cl.⁵ .............................................. B01D 21/28
[52] U.S. Cl. ..................... 210/220; 210/121; 210/242.2; 261/120
[58] Field of Search ............... 210/121, 143, 199, 207, 210/220, 242.2, 630, 139, 242.1, 232; 261/120; 138/119

[56] References Cited

U.S. PATENT DOCUMENTS

| | | | |
|---|---|---|---|
| 3,834,536 | 9/1974 | Kelsey | 210/104 |
| 3,907,672 | 9/1975 | Milne | 210/170 |
| 3,927,464 | 12/1975 | Wallsten | 138/119 |
| 4,139,471 | 1/1978 | Foti | 210/170 |
| 4,219,387 | 8/1980 | Gruntman | 210/220 |
| 4,287,062 | 9/1981 | Von Nordenskjold | 210/242.2 |
| 4,325,823 | 4/1982 | Graham | 210/86 |
| 4,436,675 | 3/1984 | Hisao et al. | 210/242.2 |
| 4,468,327 | 8/1984 | Brown et al. | 210/626 |
| 4,631,134 | 12/1986 | Schussler | 210/242.2 |
| 4,632,758 | 12/1986 | Whittle | 210/603 |
| 4,818,392 | 4/1989 | Werner et al. | 210/195.3 |
| 4,997,557 | 3/1991 | Andersen | 210/242.2 |
| 5,186,821 | 2/1993 | Murphy | 210/139 |
| 5,234,580 | 8/1993 | Murphy | 210/242.1 |

FOREIGN PATENT DOCUMENTS

3841994 6/1990 Fed. Rep. of Germany ...... 210/220

Primary Examiner—Joseph W. Drodge

[57] ABSTRACT

Disclosed is an aeration system for use in a liquid filled basin such as a wastewater treatment process and is particularly effective in a fill and draw system which requires a cyclic operation and includes air diffusion, liquid separation and decanting. The aeration system comprises an aerator which is supported by an air-filled bladder which, when inflated, raises the aerator to a position above the basin floor but when deflated allows the aerator to settle and rest on the bottom of the basin floor during the air/off settling phase and the weight of the aerator pulls the bladder and its hose supply line beneath the liquid surface of the basin thus clearing the top liquid surface. The system may take the form of a train which is affixed traversely across the basin consisting of multiple bladders and aerators which, due to the normal eddies and turbulence created by the aeration process, wander in a random pattern thus providing additional mixing other than aeration.

19 Claims, 5 Drawing Sheets

SUBMERSIBLE AERATION TRAIN AND AERATION APPARATUS FOR BIOLOGICAL PURIFICATION OF SEWAGE

CROSS REFERENCE TO RELATED APPLICATION

The present invention concerns subject matter related to subject matter of Ser. No. 07/753,860, filed Sep. 31, 1991 now U.S. Pat. No. 5,186,821 issued on Feb. 16, 1993 and Ser. No. 07/850,113, filed Feb. 19, 1991 now U.S. Pat. No. 5,234,580 issued on Aug. 10, 1993 for which notices of allowance have been issued to the present inventor and also co-pending application No. 08/006,976, filed Jan. 21, 1993, also filed on or about the same date as the present application, entitled "WASTE WATER TREATMENT PROCESS", and are incorporated herein by reference.

FIELD OF THE INVENTION

This invention relates to sewage treatment and more particularly to a system involving an open basin or tank containing a cyclic operation which includes air diffusion, liquid separation and then decanting.

BACKGROUND OF THE INVENTION

U.S. patent application Nos. '860 and '113, the disclosures of which are incorporated herein by reference, discloses and claims an improved wastewater treatment process referred to as I.D.E.A. "C.F.C.R." which is an acronym for "Intermittent Decant Extended Aeration Continuous Feed Cyclic Reactor" and incorporates CONTINUOUS FEED activated sludge technology with intermittent CYCLIC system operation requiring only a SINGLE BASIN. The system uses a single tank (reactor basin), preferably made of fiberglass in which the activated sludge is aerated over a number of predetermined cycles. Solid/liquid separation occurs during the air-off cycle. Treated effluent is decanted or withdrawn from directly below the liquid surface. Influent inflow is continuously accommodated at all times. In this way the function of flow equalization, biological oxidation, nitrification, denitrification, secondary sedimentation and aerobic sludge digestion are all carried out in a single vessel. The duration of a cycle is specific to each design application and variable in the field as required.

The Continuous Feed Cyclic Reactor (C.F.C.R.) Process of the I.D.E.A. System combines SBR, ICEAS, and Continuous Flow Activated Sludge and Extended Aeration Principles. It is a fill and draw system which accommodates continuous feed (influent) to the tank (reactor basin). The heart of the process lies in the activated sludge blanket which reduces the BOD5 (biological oxygen demand) and TSS (total suspended solids) and removes nitrogen and phosphorous in the absence of polymers or filters. Food to microorganism ratios (F:M) may vary from 0.03 to 0.3 lb. of BOD5/lb of MLSS/DAY and mixed liquor suspended solids (MLSS) design concentrations range from 1,000 to 15,000 mg/l. Actual practice has shown MLSS concentration in the 2,000 to 8,000 mg/l range to be most effective. With a hydraulic retention time (HRT) targeted for 18-36 hours and a sludge age (SRT) of at least 20 days. The Intermittent Decant Extended Aeration (I.D.E.A.) system is sized according to extended aeration standards. With such design parameters, typical excess solids (waste sludge) production ranges from 0.5 to 1.0 LB/LB of BOD5 removed. The sludge produced is quite stable with an insignificant (02) uptake rate and may be stored in a gravity sludge thickener without aeration or odors.

One of the major process advantages of the Intermittent or Cycled Extended Aeration Process (EPA Design manual "On Site Waste-Water Treatment and Disposal Systems", October 1980.) used in the I.D.E.A. System is that it provides nitrification/denitrification in addition to carbonaceous BOD5 reduction and solids removal without the addition of methanol as an organic carbon source. In addition, denitrification enhances alkalinity recovery. This prevents a PH drop which could contribute to filamentous growth and bulked sludge. Alkalinity recovery is particularly advantageous in regions of low natural alklinity.

It is this unique cyclic process which allows the I.D.E.A System to accomplish nitrification and denitrificatioh. During aeration, biological oxidation and mixing occur. Blower sizing typically provides for 1.4 to 1.6 LBS. of (02)/LB of BOD applied/day. For very low strength waste, 20 SCFM/1000 cubic feet reactor volume is provided for mixing- During aeration, excess oxygen is present, and Nitrosomonas sp. oxidize the Ammonia Nitrogen (N/NH3) to Nitrite Nitrogen (N/NO2). Nitrobacter sp. further oxidize the Nitrite Nitrogen (N/NO2) to Nitrate Nitrogen (N/NO3). Both of these are naturally occurring bacteria as a result of this Intermittent or Cycled Extended Aeration "CFCR" Process.

Nitrate, Nitrite, Ammonia and Organic Nitrogen are all inter-related in wastewater. All of these forms of Nitrogen, as well as Nitrogen Gas are biochemically interconvertible. Ammonia is generally found in large quantities in fresh domestic wastewater, however Nitrate is found only in small amounts. But in the effluent of conventional Nitrifying biological treatment plants, Nitrate is found in concentrations of up to 50 mg/L Nitrate Nitrogen. Nitrite is an intermediate state of Nitrogen, both in the oxidation of Ammonia to Nitrate and in the reduction of Nitrate to Nitrogen Gas. Such oxidation occurs in the I.D.E.A System.

During non-aerated periods (sedimentation and decantation), the Dissolved Oxygen (DO) level in the sludge blanket (MLSS) approaches zero. The lack of molecular oxygen (O2) encourages Pseudomonas sp. and other denitrifying bacteria to attack the oxygen bound up in the Nitrate (NO3) molecules. The bacteria then reduce the Nitrate (NO3) molecules to nitrogen (N2) and oxygen (O2). The molecular Nitrogen (N2), a gas, is released to the atmosphere, while the bacteria utilize the liberated Oxygen (O2). Thus, alternation of oxic and anoxic periods in the I.D.E.A. basin promotes Ammonia Nitrogen (N/NH3) removal from the waste stream of 95% or better.

Additional Nitrogen removal is accomplished through assimilation (absorption and incorporation) of Nitrogen into bacterial cell mass in satisfaction of metabolic needs. This Nitrogen is removed from the system when excess sludge is wasted from the I.D.E.A. basin. Actual operating data have shown the concentration of nitrogen in the sludge mass to be between 5% and 8% by weight of the dry solids. As can be seen, the nutrient removals and high degree of treatment characteristic of tertiary treatment systems can be had at the cost of an I.D.E.A. "CFCR" secondary treatment system.

While the above mentioned patents clearly teach improved apparatus's none of these references deal directly with the problems associated with cyclic aeration and it is this problem that the present invention addresses.

In a draw and fill cyclic aeration system such as disclosed in the above references it becomes necessary to stir up the sludge blanket after the settle phase and this is done in several ways in the prior art.

One method is exemplified by U.S. Pat. No. 3,907,672 which uses an air diffuser line which is positioned along one side of the central chamber near the bottom of the tank to diffuse air into the chamber and to promote circulation. This system of diffusing air from a permanent manifold located near or on the bottom of a chamber to be aerated is standard and well known in the industry of wastewater treatment and has been used as a system of engineering choice in many facilities.

A second method of stirring up the sludge blanket is exemplified by U.S. Pat. No. 4,818,392 which uses a motorized fan to stir up the effluent by drawing the effluent upward creating currents to lift the sludge blanket.

A third alternative is taught by common usage prior art in which grid-shaped bottom aerators are suspended from a bridge structure extending transversely of a channel-type basin. In order to ensure adequate aeration of the active sludge over the full length of the basin, the bridge structure is mounted for reciprocating movement in the longitudinal direction of the channel. It is also suggested to attach the bottom aerators to a float which may be dragged through the basin without being supported by the bridge structure carried by the basin walls.

Basins of this type are constructed as so-called compact installations, but sometimes also as large scale installations. It has become evident, however, that a sufficiently safe control of the active sludge required for the sewage purification can be achieved in an economical manner only, if at all, in the case of the smaller compact installations. In the case of larger installations there is always the danger that the active sludge in certain areas dies off in an uncontrolled manner, leading to unstable conditions in the basin during the purification of sewage.

The smaller installations as well as the larger installations suffer from the disadvantage that their construction and operation are rather expensive. The treatment basins, which in most cases are concrete structures are expensive to build, and the mechanical installations for moving the bottom aerators and controlling the aeration process are complicated and subject to failure. In addition to high capital investment this results in high operating costs mainly due to high manpower costs.

The high investment and operating costs of an installation of this type frequently leads to several communities forming a joint venture, however, this necessitates the construction of sewers from the participating communities to the common sewage treatment plant. The costs of such sewers often exceed those of the treatment plant itself.

In view of these disadvantages, large-scale earthen basin installations with and without artificial aeration have been developed for plants serving up to about 10.000 PUV (population unit value). Pure earthen basins without artificial aeration have conventionally been built only for a few hundred PUV. In these basins there prevail undefined decomposition conditions between aerobic and anaerobic areas, so that an active sludge in the usual sense cannot develop. Since the absorption of oxygen takes place only at the surface, installations of this type have to have a very large surface area, and their operation in winter is unsatisfactory. The dwelling time of the sewage in these installations is usually 30 days and above.

The installations developed from such earthen basin installations and provided with line aerators or other devices, such as spot aerators are permitted to reduce the surface area requirements, however, they are still suffering from ill defined conditions as concerns their operation, resulting in dwelling times of domestic sewage of 10 to 20 days in the aerated sector, and of up to 30 days in the installation as a whole. In installations operating under higher load one has to accept extremely long dwelling times again requiring excessively large installations. While aerobic conditions prevail in certain areas of these installations, they are not controllable, and area with anaerobic conditions cannot be avoided.

Still another alternative is exemplified by U.S. Pat. No. 4,287,062 which teaches multiple bottom aerators which are connected to a flexible cable extending over the basin in such a manner that the aerators together with the carrier are periodically driven back and forth traversely of the longitudinal extent of the carrier by, it is claimed, the air exiting from the aerators. The flexible cable also requires floatation means to keep the cable and aerators afloat. This embodiment of an aeration system depends on currents in the aeration chamber created from the input to the output in the chamber and are under continuous activation. This system leaves the floatation device and carrier cable on the surface of the water and any objects floating on the surface water of a wastewater treatment system tend to accumulate unsightly and odorous sludge and debris, often times as much as 8 inches thick. This particular system is not feasible or satisfactory in a draw and fill system such as the present invention requires.

The present invention addresses these and other problems inherent in the above systems and while the above systems are somewhat successful for their own purpose, they are not satisfactory in the system as taught by the above referenced '860, '113 and co-pending application '976.

SUMMARY

It is therefore, a primary object to provide an aeration system which cooperates with and augments the principals taught in the above reference to applications, namely, '860, '113 and co-pending application docket #832, which are incorporated herein by reference.

It is another object to provide an aeration system which cooperates with a draw and fill wastewater treatment system.

Still another object is to provide an aerator system which is a function of a cyclic wastewater treatment system.

Still another important object is to provide an aeration system with a first and second position during the air/off, air/on cycle, namely, a first position being a position in which the aeration apparatus is suspended above the bottom floor of the basin by inflatable float means such as a bladder with the float means being attached to an air supply cable or carrier lying traversely across the basin, second position being a position in which said aeration apparatus is supported by the floor of the basin which occurs when the inflatable bladders are deflated and lie beneath the surface of the liquid in the basin.

Yet another object is to provide enough slack in the air supply cable to allow the apparatus to assume its first or second position.

Another object is to provide, if desired by engineering choice, separate air supply systems to the bladders and aerators which may take the form of separate cables or carriers and which may be suitably attached to each other.

Still another object is to provide the bladders in a form independent of each other but attached together by common air supply carrier to form a "train" thus allowing each bladder to assume a random position other than a straight line position with each other.

Still another object is to facilitate the entire extended aeration process in a single basin without the need for an intregal or external clarifier and associated sludge pumping equipment, wiers, skimmers, sludge return lard piping and tankage.

Yet another object is to effectively mix one million gallons of mixed liquor in an aeration basin with 10-20% of the horsepower requirement that currently is the industry standard for low strength waste systems.

Another object is to provide an aeration system that will enable a fill and draw type of the extended aeration process to operate in a basin designed to provide a sludge age or sludge retention time (SRT) to 70 days with the same or less energy requirements that the prior art has in a system that offers a sludge age of only 20 days.

Still another object is to provide an aeration system that decreases the sludge production of such systems by as much as 70%, thereby substantially decreasing the handling cost's of excess solids removal and disposal.

Another object is to provide the bladder system in such a manner that when assuming their first inflated position they raise each of their respective aerators to substantially the same height in relation to each other above the basin floor regardless of the height of the liquid level in the basin.

It is another important object to provide, at least at one end of each aeration train, means to control on demand an air-input and air-exhaust control system such as solenoid controlled air valves which may be activated and controlled by the cyclic timer of the wastewater treatment system.

Another object is to provide the aerators in a configuration to discourage entanglement when two or more of the aerators approach each other.

Still another object is to provide weights which may be added by engineering choice to the interior of the aerators in varying amounts to cause the aerators to sink to the bottom of the basin during the air/off cycle but is light enough not to cause undo weight to be lifted during the air/on cycle, the weights being made of a material of choice and expedience such as gravel, rocks, cement, etc.

Yet another object is to take advantage of the natural whirl pools, current and eddy's which are created by the introduction of air into the lower regions of the basin by the aerators in the form of minute, fine bubbles, which when rising create a natural swirling motion of the liquid and as they reach the surface, cause the surface to "boil". It is this natural occurrence that causes the aeration and float trains to wander in an un-determined manner and they are not dependent on any "push" from the air escaping out of the aerators or currents created in prior art basin design which require an inlet and an outlet.

Another object is to provide fine bubble diffusers attached to inflatable floats such as bladders in a "train" which are moved across the basin by natural occurring turbulence during aeration.

Yet another object is to make the float bladders in sections whereby, if one section should become punctured the remaining sections would still provide buoyancy.

Still another object is to provide efficient mixing of the basin contents, as well as high oxygen transfer, at low energy usage.

Another important object is to eliminate expensive aeration piping which the present prior art systems require to be installed and which must be leveled and/or secured.

Another object is to provide the aeration trains with diffusers which, by their design, do not harm a basin liner or erode an unlined basin bottom such as an earthen basin.

Still another important object is to provide by means of the trains of diffusers, additional mixing capabilities other than aeration which results in reduced horsepower requirements as high as 70%.

Yet another object is to make inspection and maintenance cost-effective by eliminating the need for dewatering the basin.

Still another object is to provide a system that is reliable during winter and ice conditions as the rising floats, during the air/on phase, break up any skim of accumulation of ice or heavy snow and the fine bubble diffusion beneath the water minimizes wastewater cooling.

Still another important object is to provide a float and aeration train which will settle below the surface of the liquid in the basin during the air/off cycle, thus clearing the surface of any apparatus which unsightly and odorous sludge and debris can accumulate on, as happens in the prior art.

Also, another important object is to provide air pressure regulators in the separate carrier train air supplies to allow for different control settings for fine tuning the system as the job site requires.

Another important object is to provide an aeration apparatus which may be used in any open basin such as an earthen or concrete basin and is not limited in size or length to any one basin size, making this design the lowest cost alternative available.

When the above objects are achieved and implemented by the design parameters of the present invention, supernatant is produced with a drastic reduction of horsepower requirement and excess solids (waste sludge) production ranging from 0.2 to 1.0 are common with a hydraulic retention time (HRT) ranging from 16-72 hours and a sludge age (SRT) from 20-70 days.

Other objects and advantages will become obvious when taken into consideration with the following specifications and drawings.

DETAILED DESCRIPTION OF THE DRAWINGS

Figure 1:
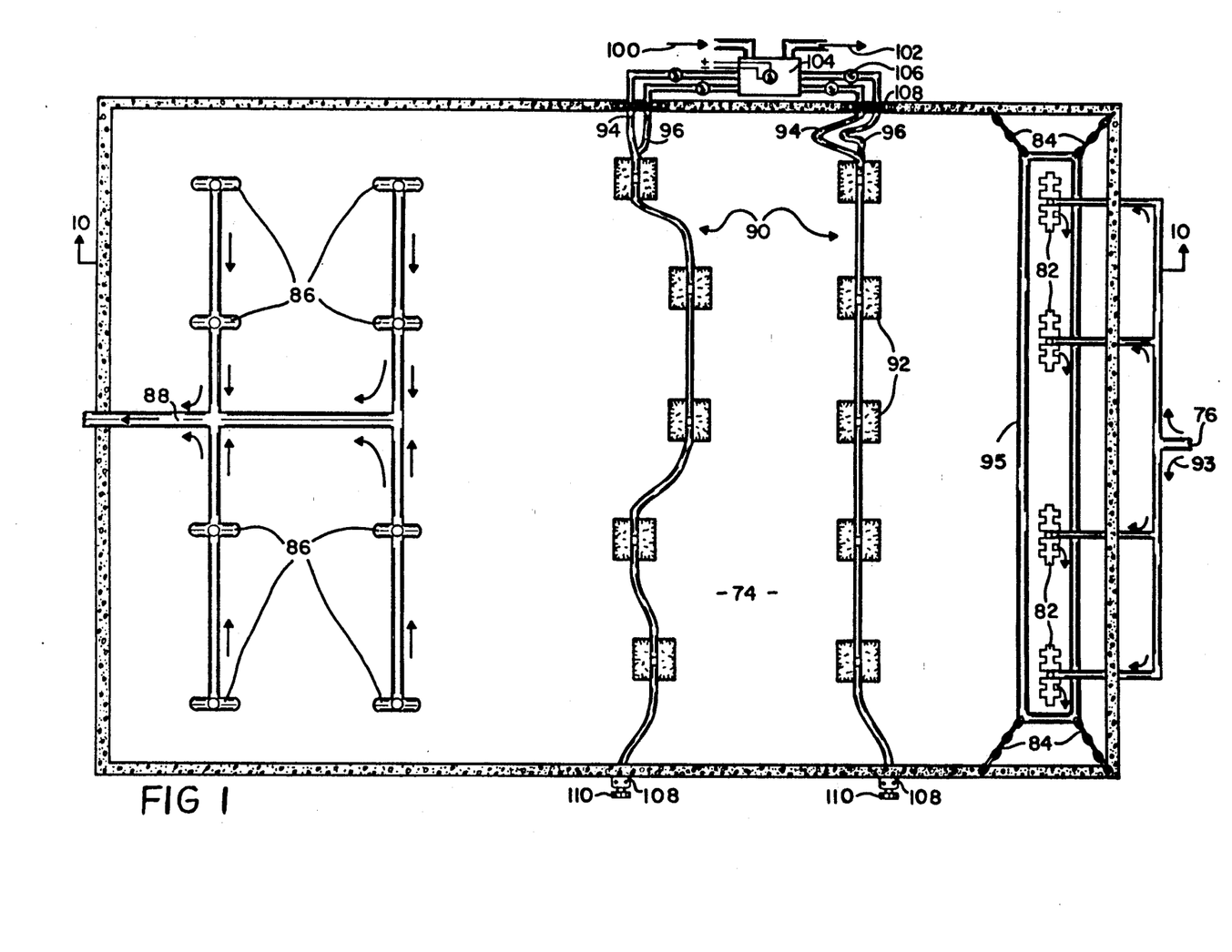
FIG. 1 is a top plan view of a wastewater treatment process as described in the present invention and other related applications.
Figure 3:
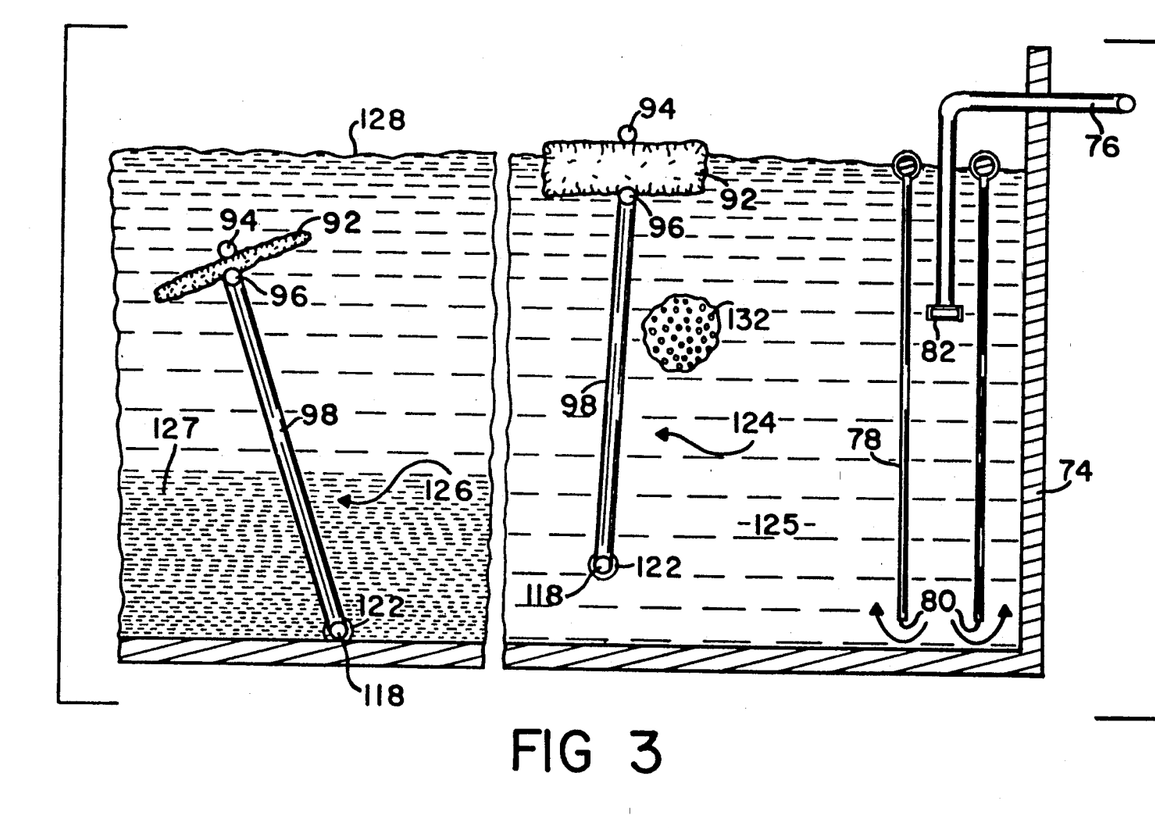
FIG. 3 is an end view in elevation of an aerator in a first and second position.
Figure 4:
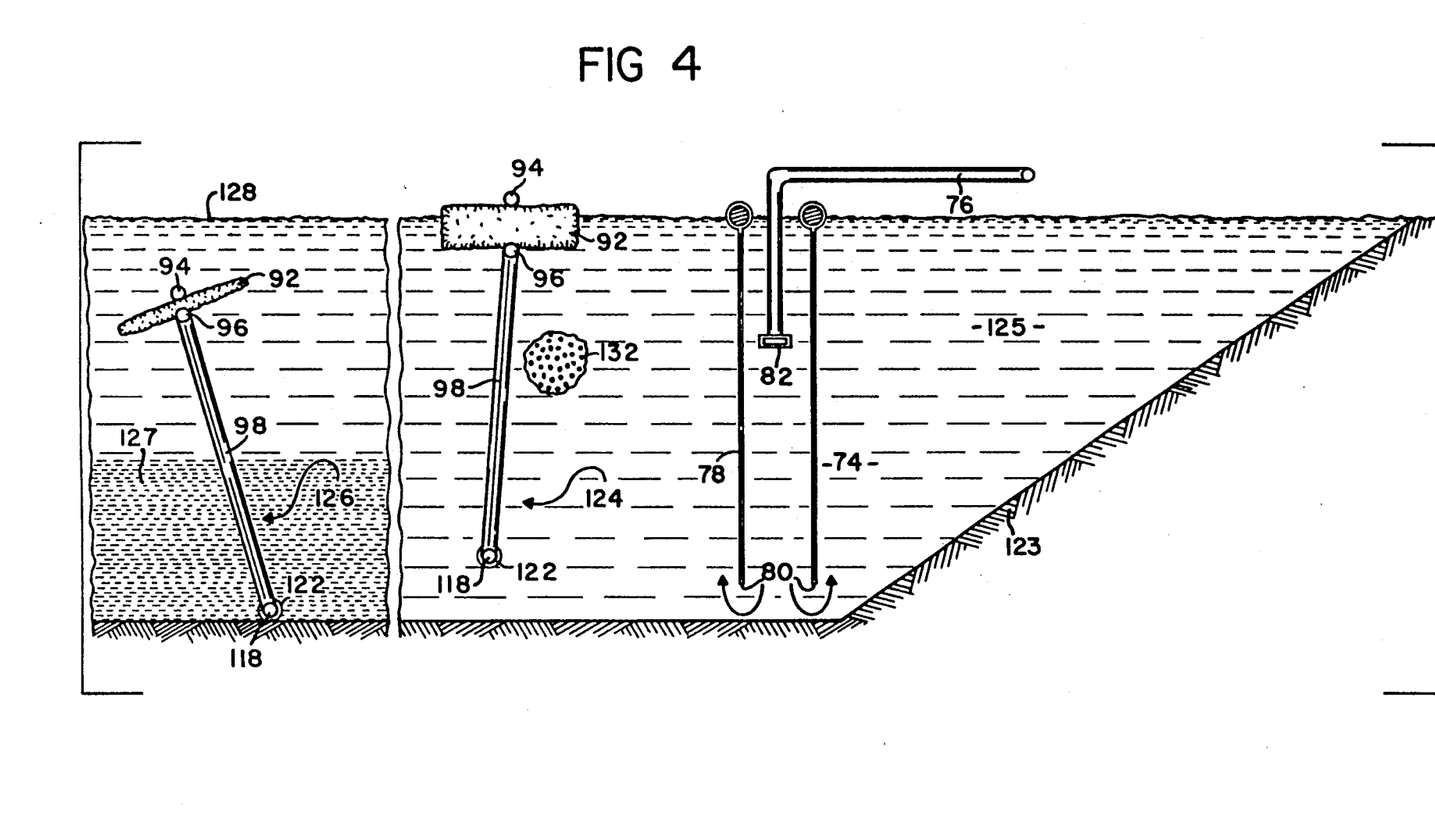
FIG. 4 is a side plan view in elevation of an earthen basin showing a first and second position of an aeration system.

Referring now in detail to the drawings wherein like characters refer to like elements throughout the various drawings, in FIG. 1, a diagrammatic top plan view is disclosed for a larger, open basin, such as an earthen or concrete basin as may be used in municipal installations with 74 being a typical open basin with 76 being the influent delivery pipe and 78 (as depicted in FIGS. 3 & 4) being the Omni-flow partition which may be made of any suitable material such as fiber-glass, coated metal or any other suitable curtain material, having an open skirt area 80 with ganged or multiple manifolds 82 with the Omni-flow partition 78 having height adjustment means such as chains 84. 86 are ganged or multiple decanters and 88 being the effluent discharge pipe. The Omni-flow partition 78, the multiple or ganged manifolds 82, and the multiple or ganged decanters 86 cooperate with the aeration system now disclosed and considered by the inventor to be the invention, and a control system such as taught in patent applications '860 and '113.

Figure 2:
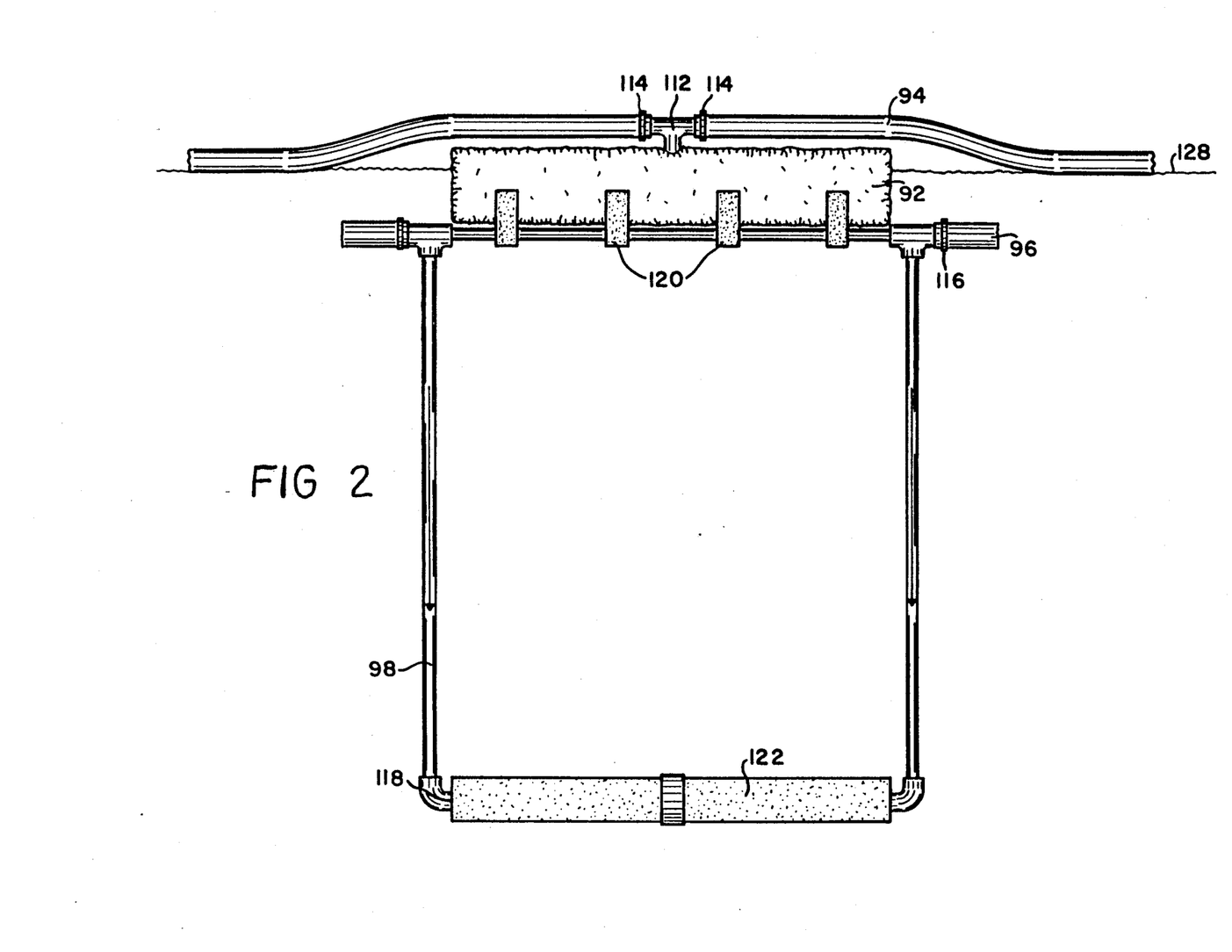
FIG. 2 is a side view in elevation of an aeration apparatus including an inflatable bladder aeration apparatus.

In general, 90 are multiple aeration diffuser "trains" consisting of bladders 92, flexible air lines 94 and 96, respectively, with 94 feeding multiple bladders 92, while 96 feeds the aeration diffusers 98 as depicted in FIGS. 2, 3 and 4, while 100 is an input air line and 102 being a discharge line, both being controlled through solenoid operated valve 104. 106 are regulators to set the air flow of each bladder "train" and aeration "train" to a pressure of engineering choice, while 108 are suitable mounting means for flexible air lines 94 and 96, respectively, with 110 being caps to close off the air lines 94 and 96, respectively.

In FIG. 2, bladder 92 which may be made in multiple sections (not shown), is taught with its T-fitting 112 being connected by suitable connectors 114 to flexible air supply line 94, while the aeration diffusers 98 are suitably connected by connectors 116 to flexible air line 96.

The aeration diffusers 98 may take a number of shapes such as a T (not shown) or the like with the preferred embodiment being in the form of a rectangle with its length being vertical and its width being horizontal which discourages entanglement when two of the diffusers 98 in different trains approach each other. The bottom cross bar 118 of the diffuser 98 may contain ballast or weights (not shown in the form of pebbles, stones, or concrete or any other materials of engineering choice, with the ballast being heavy enough to cause the diffusers 98 with their flexible hoses 94 and 96, respectively, and bladder 92 to sink below the surface of the liquid 128 when the wastewater treatment system is in its air/off cycle. The bladder 92 is suitably affixed to the diffusers 98 by means such as VELCRO ™ straps 120, while the cross bar 118 is covered by prior art rubber sleeves 122 such as exemplified by the product Flexain ™ and manufactured "Environmental Dynamics of Columbia, Ohio).

In FIGS. 3 and 4, we have shown a first and second position of one of the aerators 98 of the aeration "train" 90 with 124 being the first position assumed during the air/on cycle and showing the cross bar 118 with its rubber sleeve 122 being suspended above the basin, while 126 depicts the aerator 98 of the aeration "train" 90 resting on the bottom of basin 74 in its second position, thus submerging the entire "train" 90 below the liquid level 128 during the air/off cycle.

In FIG. 3, we show the aerators 98 being used in a concrete basin 74 while in FIG. 4, we show the aerators 98 being used in an earthen basin 123, while 125 is the sludge in a mixed and aerated state during the air/on phase, while 127 is the settling sludge blanket in its air/off phase with 132 being a blown up section showing air bubbles.

Figure 5:
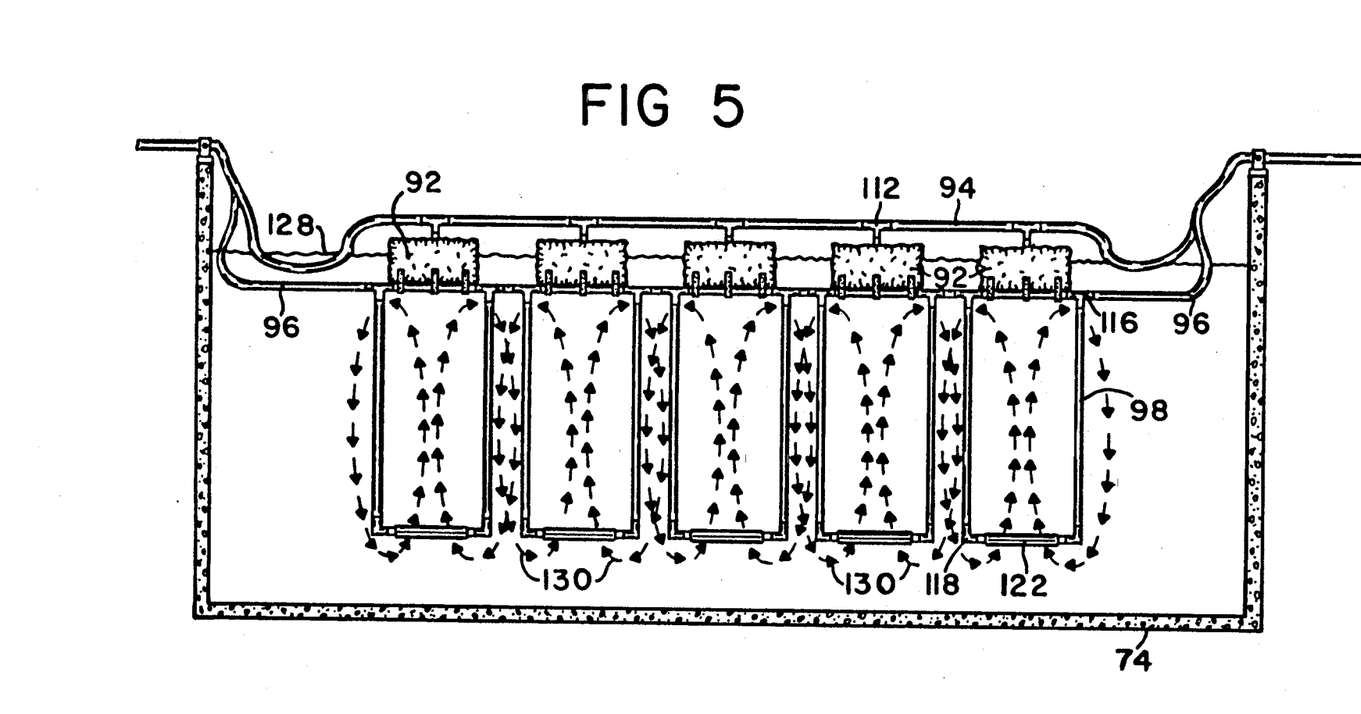
FIG. 5 is a plan view in elevation of the present invention aeration system which shows the action of the liquid during its air/on cycle.

In FIG. 5, we show a plan view of the action of the liquid in the basin during the air/on cycle and it will be seen that the uprising bubbles 132 (depicted in FIG. 4) cause the liquid to circulate in the direction of arrows 130, thus picking up the sludge blanket which has settled to the bottom of the basin during the air/off cycle.

It will now be seen that we have provided a wastewater treatment system substantially consisting of a tank, or open earthen basin, an influent delivery system, an influent velocity equalization manifold within the tank into which the incoming influent is first deposited with the manifold being surrounded by a square, circular, L-shaped or rectangular partition suspended above the tank floor or an earthen basin and substantially extending from the bottom to the top of the tank or earthen basin, thus, providing a pre-stratification zone through which only solids of a settled nature are allowed to pass through, submersible aeration means in the main tank or earthen basin, subsurface air diffusers, a floating check-valved solids excluding decanter to decant supernatent from below the surface of the liquid level, an optimum location for the floating decanter, multiple floating switches which are adjustable in height, a programmable timer, a manway, and an access cover located substantially above the I.V.E. collector, whereby, the various named elements cooperated together to provide a minimum of hydraulic turbulence and a maximum quality of supernatent effluent, even in the event of excessive hydraulic organic input of influent.

It will also be seen that we have provided an aeration diffusion system which is controlled by the control panel of a wastewater treatment system that allows the diffuser, along with the aeration "train", to sink below the level of the liquid in the basin during the air/off cycle, thus clearing the surface of the liquid during the settling cycle but rises above the floor of the basin during the air/on cycle and due to the slack in the "train" allows the "train" to wander due to the circular and boiling action of the liquid which aerates substantially the entire floor of the basin.

Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

Having described our invention, what we claim as new and desire to secure by letters patent is:

1. Aeration apparatus adapted to be used with a liquid filled basin having a bottom floor comprising; a plurality of assemblies arranged in parallel each comprising: aeration means for aerating liquid in said basin, said aeration means being configured and arranged to discourage entanglement between said parallel assemblies, inflatable float means having a top and a bottom side, means to inflate and deflate said float means, means to attach said aeration means to said bottom side of said float means, said float means and said aeration means being together configured and arranged so as to be movable between a first and second position, said first position being with said float means floating on the surface of said liquid filled basin with said aeration means being suspended above said bottom floor of said liquid filled basin and below said float means, said second position being with said float means being submerged beneath the surface of said liquid filled basin and said aeration means being substantially in contact with the bottom of said basin, whereby, when said inflatable float means is inflated, said float means and said aeration means assume their said first position and when said float means is deflated, said float means and said aeration means assume their said second position.

2. The aeration apparatus of claim 1 in which each of said aeration means is substantially in the form of a rectangle having four tubular sides with one of said sides being suitably affixed to said bottom side of said inflatable float means, said aeration means having means to be suitably affixed to an air supply.

3. The aeration apparatus of claim 2 in which each of said aeration means is weighted by multiple weights placed inside at least one of said tubular sides.

4. The aeration apparatus of claim 2 in which said four tubular sides are made of pipe sections, elbows and tee's.

5. The aeration apparatus of claim 1 in which each of said inflatable float means is a bladder.

6. The aeration apparatus of claim 5 in which each of said inflatable float means is a compartmented bladder.

7. The aeration apparatus of claim 1 in which each of said means to inflate and deflate said float means is by an air hose.

8. The aeration apparatus of claim 1 in which each of said means to attach said float means to said aeration means is by VELCRO TM.

9. The aeration apparatus of claim 1 including means to attach multiples of said inflatable float means and said aeration means in series by a common carrier.

10. The aeration apparatus of claim 9 in which said common carrier is an air hose.

11. The aeration apparatus of claim 1 in which each of said inflatable float means and said aeration means have separate air supplies.

12. The aeration apparatus of claim 11 in which said separate air supplies are separate flexible hoses.

13. The aeration apparatus of claim 12 in which said separate flexible hoses include separate air regulators.

14. The aeration apparatus of claim 12 in which said separate flexible hoses are suitable affixed together to form a common flexible support system, said support system tying said float means and said aeration means together in a series relationship to form a train.

15. The aeration apparatus of claim 14 in which said common flexible support system is of a sufficient size and length to allow said float means and said aeration means to assume their said first and said second positions.

16. The aeration apparatus of claim 14 in which said common flexible support system is affixed traversely across said basin.

17. The aeration apparatus of claim 14 in which said flexible support system is flexible enough to allow said train to wander in a random pattern when said respective float means and said aeration means are in their said first position.

18. The aeration apparatus of claim 11 in which said separate air supplies include control means to turn on and turn off said air supplies.

19. The aeration apparatus of claim 18 in which said control means are electrically controlled solenoid valves.

* * * * *